US010698990B2

(12) United States Patent
Tsou

(10) Patent No.: US 10,698,990 B2
(45) Date of Patent: Jun. 30, 2020

(54) EYE MOVEMENT TRACES AUTHENTICATION SYSTEM, METHOD, AND NON-TRANSITORY COMPUTER READABLE MEDIUM, THE SAME WHICH INTEGRATE WITH FACE RECOGNITION AND HAND RECOGNITION

(71) Applicant: UTECHZONE CO., LTD., New Taipei (TW)

(72) Inventor: Chia-Chun Tsou, New Taipei (TW)

(73) Assignee: UTECHZONE CO., LTD., New Taipei (TW)

( * ) Notice: Subject to any disclaimer, the term of this patent is extended or adjusted under 35 U.S.C. 154(b) by 148 days.

(21) Appl. No.: 15/392,444

(22) Filed: Dec. 28, 2016

(65) Prior Publication Data
US 2017/0193213 A1   Jul. 6, 2017

(30) Foreign Application Priority Data

Jan. 4, 2016   (TW) .............................. 105100034 A
Jan. 11, 2016  (TW) .............................. 105100668 A

(51) Int. Cl.
*G06F 21/00*   (2013.01)
*G06F 21/32*   (2013.01)
(Continued)

(52) U.S. Cl.
CPC ................ *G06F 21/32* (2013.01); *G06F 3/00* (2013.01); *G06F 3/013* (2013.01); *G06F 3/017* (2013.01);
(Continued)

(58) Field of Classification Search
CPC ............ G06K 9/0082; G06K 9/00604; G06K 9/00087; G06K 9/00268; G06K 9/00892; G06K 9/00382; G06K 2009/00395; G06K 9/00281; G06K 9/00375; G06K 9/0061; G06K 9/00617; G06F 21/32; G06F 3/013; G06F 21/31; G06F 3/00; G06F 3/017
See application file for complete search history.

(56) References Cited

U.S. PATENT DOCUMENTS 7,986,816 B1 * 7/2011 Hoanca .............. G06K 9/00892
382/115
8,856,541 B1 * 10/2014 Chaudhury ............. G06F 21/32
713/186
(Continued)

*Primary Examiner* — John B King
(74) *Attorney, Agent, or Firm* — Muncy, Geissler, Olds & Lowe, P.C.

(57) ABSTRACT

An eye movement traces authentication system comprises an image capturing device, a display device, and a control unit. The image capturing device is for capturing a user's image. The display device is for providing a display interface for the user to watch. The control unit includes a facial feature recognition module or hand feature recognition module, an eye-movement analyzing module, an eye movement traces unlocking module, and a volitional confirmation module. The eye movement traces authentication system uses the user's facial features to confirm the user's identity and determines the user's watching direction and eye movement, by recording user's eye movement traces from the user's watching direction to verify the user's identity and by analyzing the user's eye movement to confirm, according to the user's eye movement, whether the user is operating volitionally.

19 Claims, 14 Drawing Sheets

(51) Int. Cl.
   *G06K 9/00* (2006.01)
   *G06F 21/31* (2013.01)
   *G06F 3/00* (2006.01)
   *G06F 3/01* (2006.01)

(52) U.S. Cl.
   CPC ......... *G06F 21/31* (2013.01); *G06K 9/00268* (2013.01); *G06K 9/00382* (2013.01); *G06K 9/00892* (2013.01); *G06K 2009/00395* (2013.01)

(56) References Cited

U.S. PATENT DOCUMENTS

| | | | | |
|---|---|---|---|---|
| 9,274,599 | B1* | 3/2016 | D'Amico | G06F 3/013 |
| 9,367,677 | B1* | 6/2016 | Adhami | G06F 21/32 |
| 9,928,839 | B1* | 3/2018 | Lester | H04L 63/105 |
| 2002/0057439 | A1* | 5/2002 | Chae | G06K 9/00604 |
| | | | | 356/609 |
| 2011/0169934 | A1* | 7/2011 | Pulluru | G06F 21/32 |
| | | | | 348/77 |
| 2011/0227741 | A1* | 9/2011 | Jeon | B60R 25/102 |
| | | | | 340/573.1 |
| 2013/0336547 | A1* | 12/2013 | Komogortsev | A61B 3/113 |
| | | | | 382/117 |
| 2014/0118520 | A1 | 5/2014 | Slaby et al. | |
| 2014/0125574 | A1* | 5/2014 | Scavezze | G06F 21/31 |
| | | | | 345/156 |
| 2014/0198032 | A1* | 7/2014 | Han | G06F 3/013 |
| | | | | 345/156 |
| 2014/0289834 | A1* | 9/2014 | Lindemann | G06Q 20/42 |
| | | | | 726/7 |
| 2015/0070273 | A1* | 3/2015 | He | G06F 3/013 |
| | | | | 345/156 |
| 2015/0135309 | A1* | 5/2015 | Karmarkar | G06F 16/532 |
| | | | | 726/19 |
| 2015/0227735 | A1* | 8/2015 | Chappell | G06F 21/32 |
| | | | | 726/19 |
| 2015/0326570 | A1* | 11/2015 | Publicover | H04N 5/23229 |
| | | | | 726/4 |
| 2016/0140986 | A1* | 5/2016 | Bowers | A61B 3/113 |
| | | | | 704/271 |
| 2017/0364732 | A1* | 12/2017 | Komogortsev | G02B 27/0093 |
| 2018/0018514 | A1* | 1/2018 | Azam | G06F 21/36 |

* cited by examiner

EYE MOVEMENT TRACES AUTHENTICATION SYSTEM, METHOD, AND NON-TRANSITORY COMPUTER READABLE MEDIUM, THE SAME WHICH INTEGRATE WITH FACE RECOGNITION AND HAND RECOGNITION

BACKGROUND OF THE INVENTION

1. Field of the Invention

The present invention relates to eye movement traces authentication systems, methods, and non-transitory computer readable medium, more particularly, to an eye movement traces authentication system, method, and non-transitory computer readable medium, and the same which integrates with face recognition, hand recognition, or volitional confirmation.

2. Description of the Prior Art

User authentication entails verifying a user's identity by taking specific measures, so as to confirm the user's authority through user identity verification. A typical conventional technique of user authentication is password authentication. Password authentication involves setting a password string which contains numbers or a combination of graphics, and attributing the password string to a corresponding user. The password string may correspond to a user's authority, including accessing an object, accessing a data, and exercising a right of way.

Password authentication has a drawback: it works solely by passwords and thus depends thereon. As a result, passwords are susceptible to theft, and in consequence unauthorized use of passwords renders user authentication faulty. In this regard, password theft is often committed, for example, by recovery of fingerprints from keyboards and by keylogging.

In attempt to solve the aforesaid problem, the prior art proposes tracking a user's eye movements while the user is entering a password. The aforesaid conventional technique requires apparatuses for tracking and measuring the positions of a user's eyeballs and capturing information pertaining to the user's eye movements, respectively, and enables the user to enter passwords displayed on the screen, by watching at related positions on the screen, thereby preventing password theft. However, watching at related positions on the screen with a view to entering passwords lays open to the chance that a user's eye-movement path will be recorded by a keylogging device, and in consequence the passwords displayed on the screen can be inferred by an eye-movement mode. In view of this, persons skilled in the art have the need to prevent passwords from being divulged as a result of keylogging carried out with a keylogging device.

SUMMARY OF THE INVENTION

It is an objective of the present invention to overcome a drawback of the prior art: passwords being entered by a user's eye movements are predisposed to theft, because the user's eye-movement path can be recorded with a keylogging device.

To solve the aforesaid problem, the present invention provides an eye movement traces authentication system, comprising an image capturing device, a display device, and a control unit. The image capturing device is for capturing a user's image. The display device is for providing a display interface for the user to watch. The control unit comprises an eye-movement analyzing module, an eye movement traces unlocking module, and a volitional confirmation module. The eye-movement analyzing module is for obtaining the user's watching direction according to an eye image of the user's image. The eye movement traces unlocking module is for recording the user's watching direction to obtain an eye movement traces information, comparing the eye movement traces information with traces data of a database, generating a control signal when a comparison result is satisfactory, and sending the control signal to an identity verification apparatus. The volitional confirmation module is for providing a graphical interface or a hidden interface for the user to watch to input, obtaining the user's eye movement or watching direction, and determining whether the user is operating volitionally according to the user's eye movement or watching direction.

Further, the control unit comprises a graphic producing module for providing an eye movement traces input interface for the user to watch to operate, so that the user inputs, according to the user's watching direction, the eye movement traces information.

Further, the eye movement traces input interface of the graphic producing module provides an auxiliary graphic for the user to watch, so that the user inputs the eye movement traces information according to the auxiliary graphic.

Another object of the present invention is to provide a eye movement traces authentication system which integrates with face recognition, comprising an image capturing device, a display device, and a control unit. The image capturing device is for capturing a user's image. The display device for providing a display interface is for the user to watch. The control unit comprises a facial feature recognition module, an eye-movement analyzing module, and an eye movement traces unlocking module. The facial feature recognition module is for obtaining the user's image, capturing facial features from the user's image, and comparing the facial features with facial data of a database, so as to verify the user's identity. The eye-movement analyzing module is for obtaining the user's watching direction according to an eye image of the user's image. The eye movement traces unlocking module is for recording the user's watching direction to obtain an eye movement traces information, comparing the eye movement traces information with traces data of the database, generating a control signal when a comparison result is satisfactory, and sending the control signal to an identity verification apparatus.

Further, the facial features include one of face feature images, iris images, and images of blood vessel distribution of a sclera region.

Another object of the present invention is to provide an eye movement traces authentication system which integrates with hand recognition, comprising an image capturing, a hand feature capturing device, a display device, and a control unit. The image capturing device is for capturing a user's image. The hand feature capturing device is for capturing the user's hand feature information. The display device for providing a display interface is for the user to watch. The control unit comprises a hand feature recognition module, an eye-movement analyzing module, and an eye movement traces unlocking module. The hand feature recognition module is for obtaining the user's hand feature information through the hand feature capturing device, and comparing the hand feature information with data of a database, so as to verify the user's identity. The eye-movement analyzing module is for obtaining the user's watching direction according to an eye image of the user's image. The eye movement traces unlocking module is for recording the user's watching direction to obtain an eye movement traces information, comparing the eye movement traces information with traces data of the database, generating a control signal when a comparison result is satisfactory, and sending the control signal to an identity verification apparatus.

Further, the hand feature information includes one of fingerprint feature information and palm feature information.

Further, the control unit further comprises a volitional confirmation module for providing a graphical interface or a hidden interface for the user to watch to input, obtaining one of an eye movement and a watching direction of the user, and determining whether the user is operating volitionally according to one of the eye movement and the watching direction of the user.

Further, the control unit comprises a graphic producing module for providing an eye movement traces input interface for the user to watch to operate, so as to input the eye movement traces information according to the user's watching direction.

Further, the eye movement traces input interface of the graphic producing module provides an auxiliary graphic for the user to watch, so that the user inputs the eye movement traces information according to the auxiliary graphic.

Another object of the present invention is to provide an eye movement traces authentication method, comprising the steps of capturing a user's image; capturing an eye image from the user's image and obtaining the user's watching direction from the eye image; recording the user's watching direction to obtain an eye movement traces information; comparing the eye movement traces information with traces data of a database, generating a control signal when a comparison result is satisfactory, and sending the control signal to an identity verification apparatus; and providing a graphical interface or a hidden interface for the user to watch to input, obtaining one of an eye movement and a watching direction of the user, and confirming whether the user is operating volitionally according to one of the eye movement and the watching direction of the user.

Another object of the present invention is to provide an eye movement traces authentication method which integrates with face recognition, comprising the steps of capturing a user's image; capturing facial features from the user's image and comparing the facial features with facial data of a database, so as to confirm the user's identity; capturing an eye image from the user's image and obtaining the user's watching direction from the eye image; recording the user's watching direction to obtain an eye movement traces information; and comparing the eye movement traces information with traces data of the database, generating a control signal when a comparison result is satisfactory, and sending the control signal to an identity verification apparatus.

Further, the facial features include one of face feature images, iris images, and images of blood vessel distribution of a sclera region.

Another object of the present invention is to provide an eye movement traces authentication method which integrates with hand recognition, comprising the steps of capturing a user's image; capturing hand feature information from the user's image and comparing the hand feature information with hand data of a database, so as to confirm the user's identity; capturing an eye image from the user's image and obtaining the user's watching direction from the eye image; recording the user's watching direction to obtain an eye movement traces information; and comparing the eye movement traces information with traces data of the database, generating a control signal when a comparison result is satisfactory, and sending the control signal to an identity verification apparatus.

Further, the hand feature information includes one of fingerprint feature information and palm feature information.

Further, the aforesaid eye movement traces authentication method further comprises providing a graphical interface or a hidden interface for the user to watch to input, obtaining one of an eye movement and a watching direction of the user, and confirming whether the user is operating volitionally according to one of the eye movement and the watching direction of the user.

Further, the step of recording the user's watching direction further comprises providing an eye movement traces input interface for the user to watch to operate, so as to input the eye movement traces information according to the user's watching direction.

Further, the step of providing the eye movement traces input interface, the eye movement traces input interface provides an auxiliary graphic for the user to watch, so that the user inputs the eye movement traces information according to the auxiliary graphic.

A non-transitory computer readable medium storing an eye movement traces authentication method, when executed on a computer system, causing the computer system to implement the aforesaid methods.

Compared with the prior art, the present invention has advantages as follows:

1. The present invention discloses verifying a user's identity by face recognition (or hand recognition) and eye movement traces to reduce that passwords will be cracked by a third party. The aforesaid technology not only ensures that passwords for use in Web-based activities and real-world activities will not be lost or reproduced, but also ensures that users use the passwords volitionally.

2. The present invention discloses eye movement traces authentication so that the same password is never reused and thus cannot be cracked by a third party, not to mention that the eye movement traces authentication reduces the chance that a third party will guess the password right.

BRIEF DESCRIPTION OF THE DRAWINGS

FIG. 8-1 and FIG. 8-2 are schematic views (1) of an eye movement traces input interface of the present invention;

FIG. 9-1 and FIG. 9-2 are schematic views (2) of the eye movement traces input interface of the present invention;

FIG. 10-1 and FIG. 10-2 are schematic views (3) of the eye movement traces input interface of the present invention;

DETAILED DESCRIPTION OF THE EMBODIMENT OF THE INVENTION

The details and technical solution of the present invention are hereunder described with reference to accompanying drawings. For illustrative sake, the accompanying drawings are not drawn to scale. The accompanying drawings and the scale thereof are restrictive of the present invention.

The present invention provides an eye movement traces authentication system 100 which integrates with face recognition or hand recognition and is applicable to an identity verification apparatus 1A to confirm a user's identity. Examples of the identity verification apparatus 1A include a safe, an access control system, an ATM device, an online ATM device, a natural person certificate device, and the like, but the present invention is not limited thereto.

Figure 1:
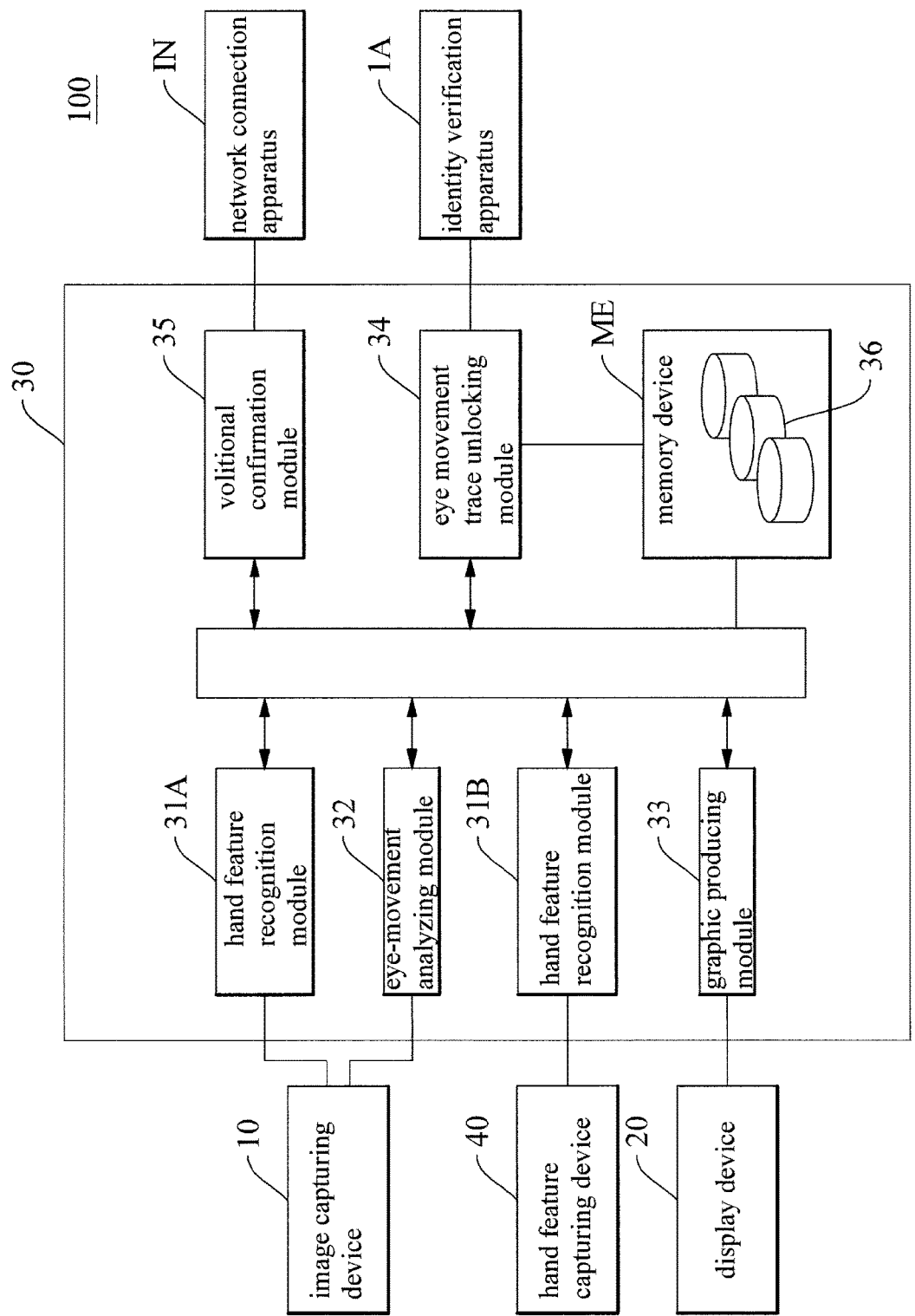
FIG. 1 is a block diagram of an eye movement traces authentication system of the present invention.

An eye movement traces authentication system of the present invention is illustrated by a specific embodiment below. FIG. 1 is a block diagram of an eye movement traces authentication system of the present invention.

The eye movement traces authentication system 100 comprises an image capturing device 10, a display device 20, a hand feature capturing device 40, and a control unit 30 connected to the image capturing device 10, display device 20, and hand feature capturing device 40.

The image capturing device 10 captures a user's images to further capture images of the user's facial and eyes features. Specifically, the image capturing device 10 is a camera which comes with charge coupled devices (CCD) or complementary metal-oxide semiconductor (CMOS), but the present invention is not limited thereto. After capturing the user's images, the image capturing device 10 sends the user's images to the control unit 30 for analysis.

The display device 20 provides a display interface 21 to be watched at by the user. The display interface 21 is a TN panel (Twisted Nematic), STN panel (Super-twisted Nematic Display), VA panel (Vertical Alignment), IPS panel (In-Plane Switching), PLS panel (Plane to Line Switching), ASV panel (Advanced Super-V), FFS panel (Fringe Field Switching), OCB (Optical Compensated Birefringence), the like, or conventional CRT (Cathode Ray Tube) screen, but the present invention is not limited thereto.

The hand feature capturing device 40 is a fingerprint capturing device or a palm feature capturing device.

Specifically speaking, the fingerprint capturing device is a non-contact optical scanner, or a contact silicon-chip scanner, or the like. The optical scanner comprises an array of thousands of charge coupled devices and captures images of the user's fingertips to obtain digital grayscale images of ridges and furrows of the fingertips and effectuate binarization of the digital grayscale images, thereby obtaining fingerprint features. The silicon-chip scanner sets the predetermined capacitance level of thousands of capacitors on the array by induction. The ridges and furrows of the fingertips take the small amount of charges on the scanner array and thus change the potential levels of the capacitors on the array, and in consequence fingerprint features of a fingertip in contact with the scanner can be read from the changed potential levels. The fingerprint features are patterns of ridges and furrows of the fingertip. The obtained fingerprint features are sent to a hand feature recognition module 31 of the control unit 30 and then compared with data stored in a database 36 of the control unit 30. In addition to the above techniques, the user's fingerprint features can be obtained by means of temperature difference, pressure difference, infrared, or the like, but the present invention is not limited to the aforesaid two embodiments.

Specifically speaking, the palm feature capturing device is a scanner, camera, palm image capturing device, infrared camera, or the like. The scanner comprises a xenon lamp or a luminescent lamp which serves as a light source. The scanner further comprises CCDs for performing a linear scan unidirectional, to and fro, so as to obtain the user's palmar images, wherein redundant information, such as information pertaining to palmar creases, is removed by adjusting the scanner's parameters. The camera is, for example, a CCD camera or a CMOS camera, which enhances the sharpness of a palm print and reduces noise through an appropriate filter and an appropriate light ray. The palm image capturing device is specially designed to obtain a palm image and disposed above a CCD camera or a CMOS camera. The palm image capturing device comprises a fixed lighting module which not only emits a light ray from a fixed angle but also provides a space corresponding in shape and size to the user's palm such that the center of the user's palm is suspended in the air. The palm image capturing device further comprises a casing which blocks ambient light so as to obtain perfect palmar images. The infrared camera works by infrared lighting and takes pictures of the veins of the user's palm, wherein oxygen-carrying hemoglobin's undergo an infrared scan. Degenerated hemoglobin's absorb infrared; hence, in the pictures taken of the user's palm by the infrared camera, the veins are black in color, whereas the rest of the palm is white in color.

In another preferred embodiment, the hand feature capturing device 40 can be replaced with the image capturing device 10 such that the user moves the finger or palm into the image-capturing region of the image capturing device 10, so as for the user's hand information to be obtained. To this end, it is also feasible that the hand feature capturing device 40 is integrated into the image capturing device 10 in another variant embodiment of the present invention.

The control unit 30 is coupled to a memory device ME which stores a program or data such that related steps can be executed by accessing the program or data stored in the memory device ME. The control unit 30 is a central processing unit (CPU) or any programmed, general/dedicated device, such as a microprocessor, a digital signal processor (DSP), a programmed controller, an application specific integrated circuit (ASIC), a programmable logic device (PLD), and a combination thereof. The memory device ME is a fixed or movable random access memory (RAM), read-only memory (ROM), flash memory, equivalent memory, or a combination thereof. In a variant embodiment of the present invention, the memory device ME comprises one or more accessible non-volatile memory components. Specifically speaking, the memory device ME is a hard disk drive, memory card, integrated circuit, or firmware. In another preferred embodiment, the control unit 30 and the memory device ME together form a processor, wherein programs prestored in the memory device ME are loaded onto the control unit 30 to execute related algorithms, respectively.

Two different embodiments for the identity verification apparatus 1A are described below.

Figure 2:
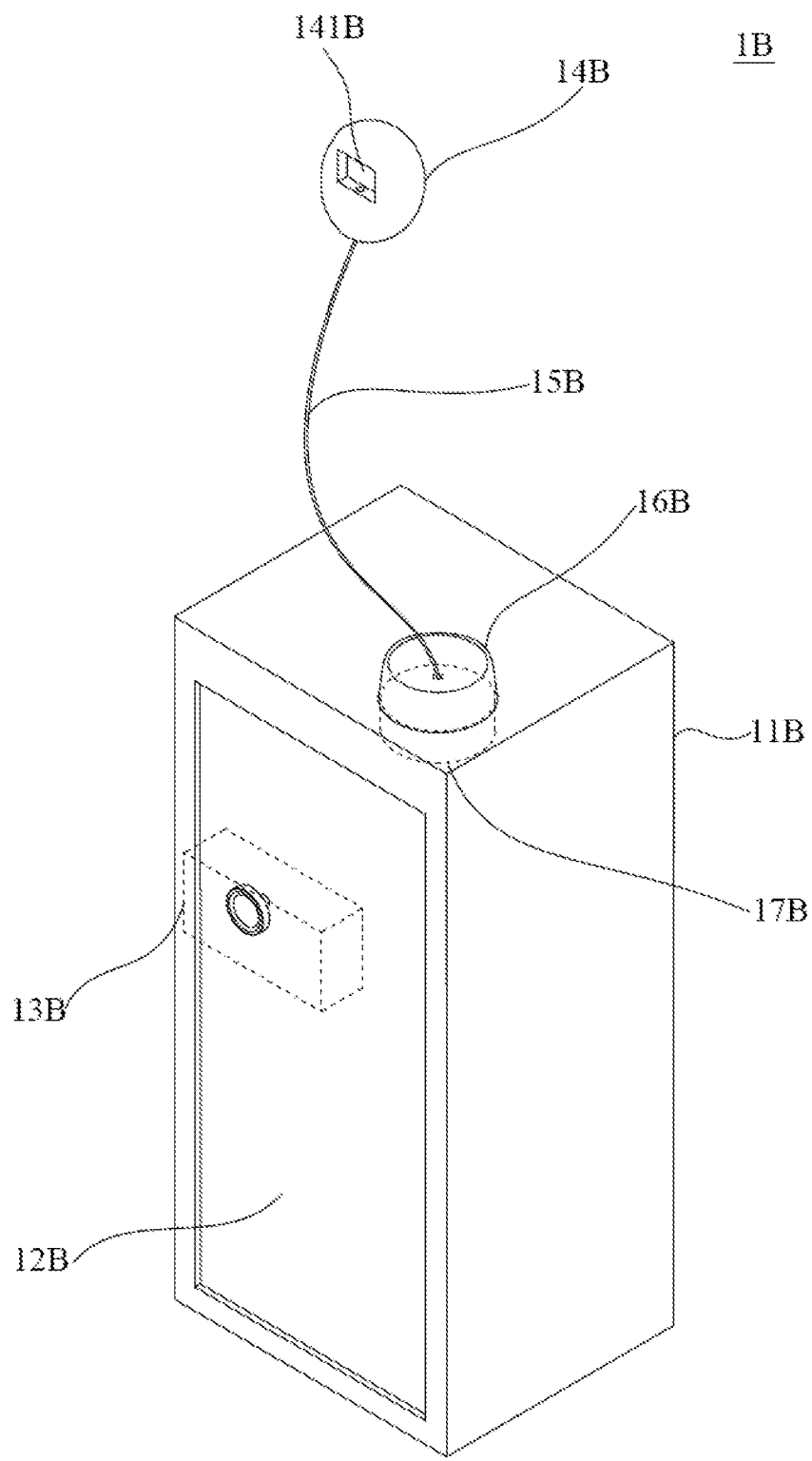
FIG. 2 is a schematic view of the first embodiment of the present invention.

In a preferred embodiment, the identity verification apparatus 1A is a safe 1B. Referring to FIG. 2, the safe 1B comprises a casing 11B, a protective door 12B, a door-locking module 13B, and an ocular device 14B. The casing 11B has therein a receiving space for containing an object. The protective door 12B is movably disposed on one side of the casing 11B to conceal the receiving space; hence, the receiving space is insulated from the outside and thus hermetically sealed. The door-locking module 13B controls the opening and shutting of the protective door 12B. The ocular device 14B and the casing 11B are connected by a transmission line 15B. A storage box 16B is disposed on the casing 11B. A winder 17B is disposed below the storage box 16B. When the safe 1B is not in use, the user can wind the transmission line 15B on the winder 17B and then store it below the storage box 16B.

The ocular device 14B has therein the display device 20 and the image capturing device 10. To operate the ocular device 14B, the user puts a window 141B of the ocular device 14B near the user's eyes and then moves the cursor on the display device 20 according to the watching direction so as to enter authentication input data and unlock or lock the door-locking module 13B according to the result of password comparison.

Figure 3:
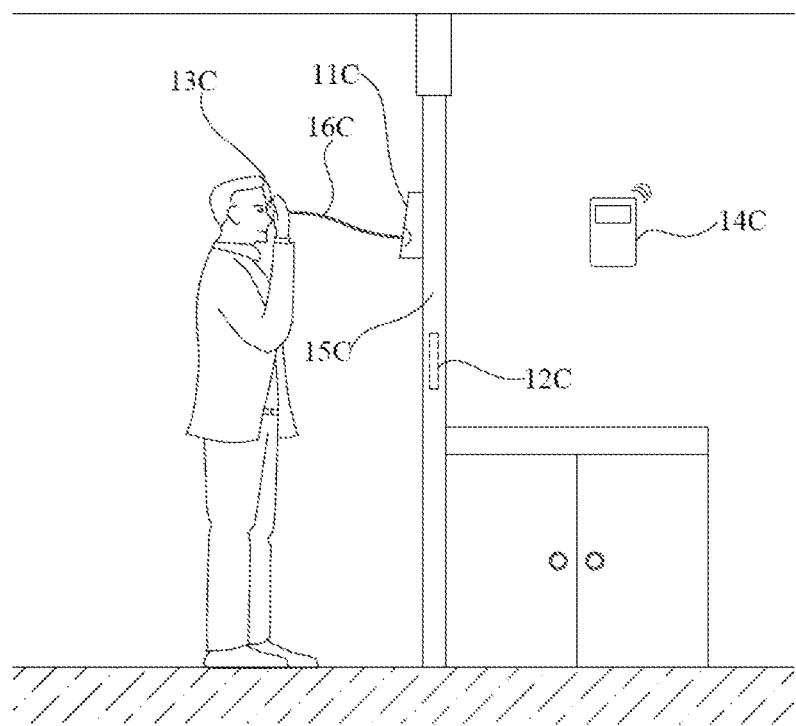
FIG. 3 is a schematic view of the second embodiment of the present invention.

In another preferred embodiment, the identity verification apparatus 1A is an access control system 1C shown in FIG. 3. The access control system 1C comprises a wall-mounted host 11C, a door-locking module 12C, and an ocular device 13C. A security host 14C is disposed indoors. The wall-mounted host 11C is disposed on one side of a door 15C or is directly disposed on the door 15C. The door-locking module 12C controls the opening and shutting of the door 15C. The ocular device 13C and the wall-mounted host 11C are connected by a transmission line 16C. A positioning slot is disposed on the wall-mounted host 11C. A winder is disposed on the inner side of the wall-mounted host 11C. When the access control system 1C is not in use, the user can wind the transmission line 16C on the winder and then store it in the wall-mounted host 11C such that the ocular device 13C is stored in the positioning slot for holding the ocular device 13C.

The ocular device 13C has therein the display device 20 and the image capturing device 10. To operate the ocular device 13C, the user puts a window of the ocular device 13C near the user's eyes and then moves the cursor on the display device 20 according to the watching direction so as to enter authentication input data.

The control unit 30 comprises a facial feature recognition module 31A, a hand feature recognition module 31B, an eye-movement analyzing module 32, a graphic producing module 33, an eye movement traces unlocking module 34, a volitional confirmation module 35, and the database 36. The facial feature recognition module 31A, hand feature recognition module 31B, eye-movement analyzing module 32, graphic producing module 33, eye movement traces unlocking module 34, volitional confirmation module 35, and database 36 are stored in a memory device in the control unit to perform their respective functions. In another preferred embodiment, the facial feature recognition module 31A, hand feature recognition module 31B, eye-movement analyzing module 32, graphic producing module 33, eye movement traces unlocking module 34, volitional confirmation module 35, and database 36 are stored in another memory device outside the control unit, but the present invention is not limited thereto.

The database 36 stores user data and user index. The user data comprises user-configured identity information, such as user authority, full name, date of birth, and any related personal information. The user index comprises user-related passwords, traces passwords, iris codes, sclera codes, face feature codes, fingerprint features, and palm features. The user index is characterized in that every user has his or her unique code so that identity verification entails identifying a user with codes which correspond to passwords, traces passwords, iris codes, sclera codes, face feature codes, fingerprint feature information, palm feature information, or a user's name entered by an I/O apparatus, so as to determine the user authority according to the user's user data. The user enters the user data, including the aforesaid passwords and identity data, into the database 36 with an I/O apparatus (such as a keyboard or a touchscreen) and the image capturing device 10 according to predetermined settings.

The facial feature recognition module 31A is for obtaining the user's image, capturing facial features from the user's image, and comparing the facial features with facial data of the database 36 to confirm the user's identity. In a preferred embodiment, to achieve a precise recognition rate, the facial features are the user's iris features, face features, sclera features, or a combination thereof (for example, performing iris feature comparison first, and then performing face feature comparison and sclera feature comparison.)

The embodiments of iris feature recognition, face feature recognition, and sclera feature recognition are described below, respectively.

In a preferred embodiment, the facial feature recognition module 31A captures the user's eye-related image from the user's image to obtain iris features from the iris region in the eye-related image. The facial recognition process entails comparing the captured iris features with iris data (facial data) stored in the database 36, so as to confirm the user's identity.

The iris comparison method is briefly described below. Since the iris manifests a high reflection rate at the near infrared frequency band, the user's eye is irradiated with near infrared with a view to capturing an iris-related image in order to obtain iris features easily. Afterward, the facial feature recognition module 31A defines an eye region in the user's facial image and performs binarization on the eye region to obtain a border between iris and sclera as well as a border between iris and pupil so that the region between the two borders is defined as the iris region. To preclude any effect imposed on the iris by variations arising from the dilation and contraction of the pupil, the obtained iris-related image undergoes normalization and then comparison. Afterward, iris features are extracted from the normalized iris-related image by a filter to represent iris data. The extracted data is binary iris codes. Finally, the extracted iris codes are compared with iris data of the database 36 one by one to find the closest iris data, so as to confirm the user's authority.

In addition to the embodiment of executing user authentication by iris features, another preferred embodiment is characterized in that the facial feature recognition module 31A captures the user's face-related image and compares it with the facial data of the database 36, so as to confirm the user's identity. In this embodiment, the facial features are face profile, relative positions of face features, and facial protuberances shown in the user's face-related image.

Specifically speaking, the facial features are analyzed with algorithms by related techniques, including Principal Component Analysis (PCA), Linear Discriminant Analysis (LDA), Orthogonal Local Preserving Projection (OLPP), Discrete Wavelet Transform, Support Vector Machine, and K-nearest Neighbors, such that facial features, including face profile, relative positions of face features, and facial protuberances, can be compared with facial data of the database 36, so as to determine the user's authority.

Related techniques of face feature recognition are disclosed in the prior art and thus are not described herein for the sake of brevity.

In another preferred embodiment, the facial feature recognition module 31A captures the user's eye image from the user's image and captures a sclera image from a sclera region in the eye image so that the captured sclera image is compared with sclera data of the database 36 to effectuate face recognition, so as to confirm the user's identity. The facial features are blood vessel distribution features of the sclera region in the user's eye-related image. In principle, the sclera recognition method is similar to the iris recognition method, as both of them involve capturing interested regions by binarization. The main difference between sclera recognition and iris recognition lies in the captured region. The images captured in iris recognition are focused on the iris texture of the human eye, whereas the images captured in sclera recognition are focused on blood vessel distribution of the sclera of the human eye.

The method of sclera comparison is briefly described below. First, the facial feature recognition module 31A defines an eye region in the user's face-related image and performs binarization (or color separation) on the eye region to obtain a border between eyelid and sclera as well as a border between sclera and cornea so that the region between the two borders is defined as the sclera region. The captured sclera image undergoes normalization to obtain sclera features for facilitating subsequent comparison. Blood vessel distribution features are extracted from the normalized sclera image by a filter to represent sclera data. The extracted data is binary sclera codes. Finally, the extracted sclera codes are compared with sclera data of the database 36 one by one to find the closest sclera data, so as to confirm the user's authority.

After the image capturing device 10 has captured the user's image, the captured user's image is sent to the eye-movement analyzing module 32 for analysis, so as to obtain the user's watching direction and form an operable cursor according to the watching direction.

The hand feature recognition module 31B is for obtaining the user's image, capturing hand features from the user's image, and comparing the hand features with hand data of the database 36 to confirm the user's identity. In a preferred embodiment, to achieve a precise recognition rate, the hand features are the user's fingerprint feature information, palm feature information, or a combination thereof (for example, performing fingerprint feature comparison first, and then performing palm feature comparison.)

The hand feature recognition module 31B obtains the user's hand feature information through the hand feature capturing device 40 and then compares the hand feature information with data of the database 36 to confirm the user's identity. The hand feature recognition module 31 is a fingerprint feature recognition module or a palm feature recognition module.

The fingerprint feature recognition module obtains the user's fingerprint features (hand feature information) through the hand feature capturing device 40 and then compares the fingerprint features with data of the database 36 to confirm the user's identity. Upon completion of the comparison, the fingerprint feature recognition module finds, by a user index, the user data and authority corresponding to the fingerprint features, and generates a control signal according to the user's authority, or further executes the password entering process, or further confirms the user's volition, so as to give protection to the user's data twice. In a preferred embodiment, the fingerprint feature recognition module converts the fingerprint structure features (core and delta) or fingerprint detail features (bifurcation and endpoint) into feature codes, and then stores the feature codes in the database 36 to serve as recognition references. To perform the comparison, with the feature codes captured from the user's fingerprint structure features or fingerprint detail features, the user index is searched for conforming user data, to confirm the user's identity and authority. However, the aforesaid technique is merely an exemplary preferred embodiment, as the present invention is not limited to the embodiment.

The palm feature recognition module obtains the user's palm features (hand feature-related information) from the hand feature capturing device 40 and then compares the palm features with data of the database 36 to confirm the user's identity. Upon completion of the comparison, the palm feature recognition module finds, by a user index, the user's data and authority corresponding to the palm features and generates a control signal according to the user's authority, or further executes the password entering process, or further confirms the user's volition, so as to give protection to the user's data twice. In a preferred embodiment, the palm features are geometric features, such as the length and width of the phalanges of the hand, as well as the area, length and thickness of the palm, or a palm print extracted from a palm image, or palmar blood vessel distribution. The palm feature recognition module obtains palm features by marginalization, palm print extraction, interested region segmentation, or binarization, converts the palm features into feature codes, and stores the feature codes in the database 36 to serve as recognition references. To perform the comparison, with the feature codes captured from the user's palm features, the user index is searched for conforming user data, to confirm the user's identity and authority. However, the aforesaid technique is merely an exemplary preferred embodiment, as the present invention is not limited to the embodiment.

After capturing the user's images, the eye-movement analyzing module 32 calculates the user watching direction and eye movements according to eye features of the user's images. The watching direction means the coordinates of the display device 20, which the user is looking at. The eye-movement analyzing module 32 generates eye movement-related information by analyzing the geometric relation between the pupil center and light spots, so as to confirm the watching direction. The eye-movement analyzing module 32 obtains, by linearization, the positions of the user's pupil center and light spots shown in the captured eye-related images, defines a standard line according to the position of the pupil center, generates connection lines between the pupil center and the light spots, measures the included angles between the standard line and the connection lines, and determines the geometric relation between the pupil center and the light spots according to the included angles, thereby determining the watching direction. The process flow involves creating a plurality of samples of the human eye movements by a trainer and then determining the user watching direction by interpolation, so as to confirm the user watching direction.

The eye movements are calculated with a simple algorithm, for example, to determine the commands entered by the user, according to the directions of the movements of the eyeballs and the paths of the movements of the eyeballs. In a preferred embodiment, the eye movements are obtained by a simple algorithm, for example, to divide the sclera between the two eyelids into a plurality of blocks and then generate a control signal according to the ratio of the blocks. Related techniques of detecting eye movements and watching directions are disclosed in the prior art and thus are not reiterate herein for the sake of brevity.

The eye movement traces unlocking module 34 records the user's watching direction to thereby obtain an eye movement traces information, compares the eye movement traces information with traces data of the database 36, generates a control signal when the comparison result is satisfactory, and sends the control signal to the identity verification apparatus 1A. The eye movement traces unlocking module 34 obtains the user's watching directions through the eye-movement analyzing module 32, records the coordinates corresponding to each watching direction, forms a code string according to sequence and connection of the watching directions, stores the code string, compares the code string with the traces data stored in the database 36 so as to verify the user's identity. When started, the graphic producing module 33 provides an eye movement traces input interface for the user to watch to operate, so that the user inputs the eye movement traces information according to the user's watching direction. In a preferred embodiment, the eye movement traces input interface of the graphic producing module 33 provides an auxiliary graphic for the user to watch, so that the user inputs the eye movement traces information according to the auxiliary graphic.

The volitional confirmation module 35 is connected to the graphic producing module 33 to provide a graphical interface or a hidden interface for the user to watch at and enter data into. The graphical interface or the hidden interface corresponds in position to the eye-movement analyzing module 32, allowing the user's eye movements or watching direction to be obtained. The volitional confirmation module 35 determines, according to the user's eye movements or watching direction, whether the user is operating volitionally.

Figure 4:
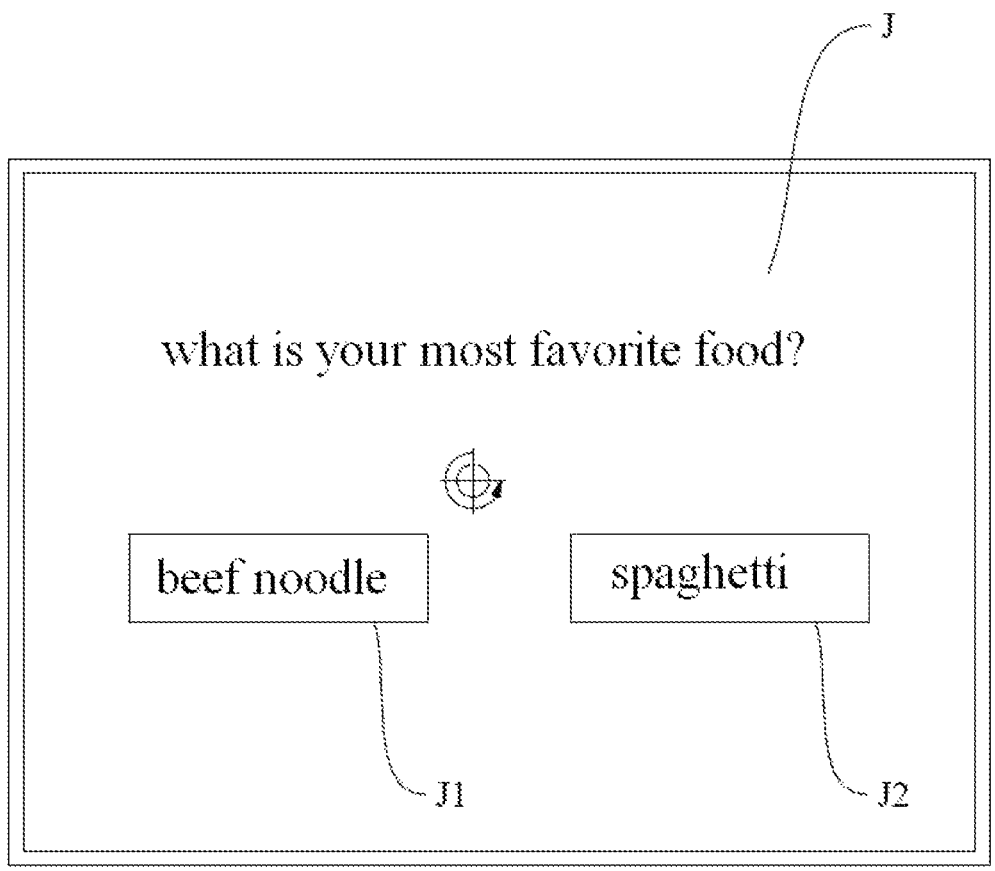
FIG. 4 is a schematic view of a volitional enquiry-response menu of the present invention.

In a preferred embodiment, after the volitional confirmation mode has started, the graphic producing module 33 provides a graphical interface J for use by the user. The graphical interface J provides a smart enquiry-response function. Depending on the identity information previously entered by the user, the smart enquiry-response function generates related enquiry-response content and thereby determines, according to the result of the enquiry-response content, whether the user is operating the device volitionally. Referring to FIG. 4, in response to the user's identity, the volitional confirmation module 35 poses a question for the user to answer. In this embodiment, the question is: what is your most favorite food? The graphical interface J displays option buttons J1, J2. The option button J1 shows an icon of beef noodle. The option button J2 shows an icon of spaghetti. If the user initially set his or her favorite food to beef noodle in an initial configuration process and now selects the option button J2 (spaghetti), the volitional confirmation module 35 will determine that the user is operating the menu but not volitionally, and thus will generate a related control signal. In a preferred embodiment, the control signal is, for example, sent to a security apparatus to execute a locking function and preclude any access. In another preferred embodiment, the control signal is sent to a background center through a network connection apparatus IN to thereby give an alert to the background center.

Figures 1, 9:
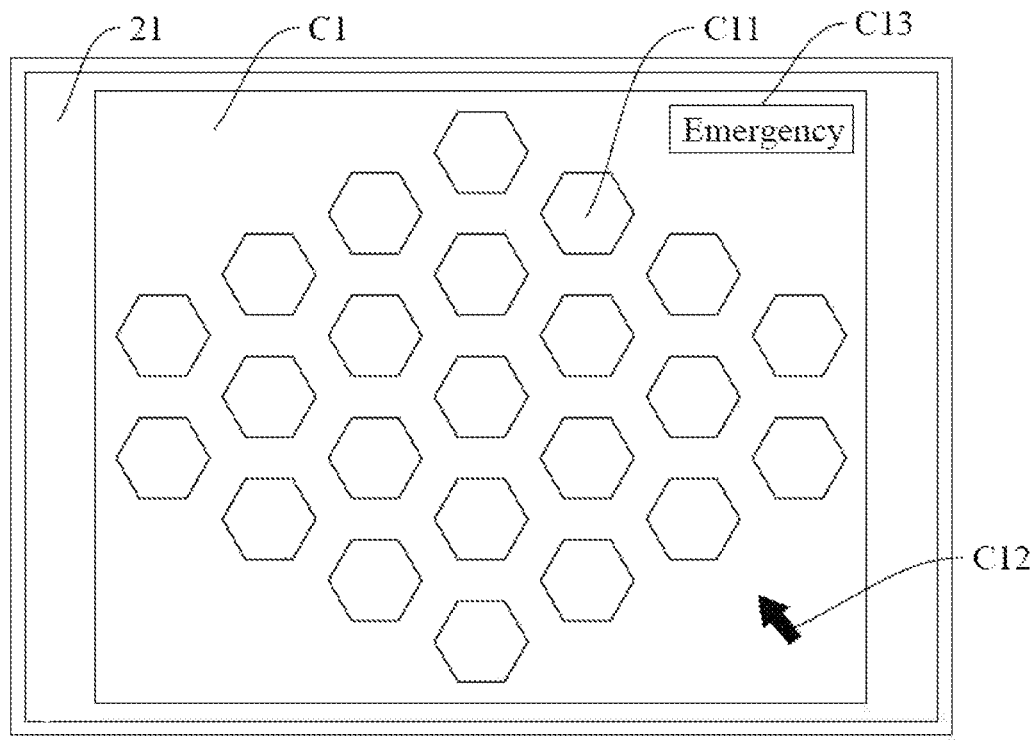
Figures 2, 9:
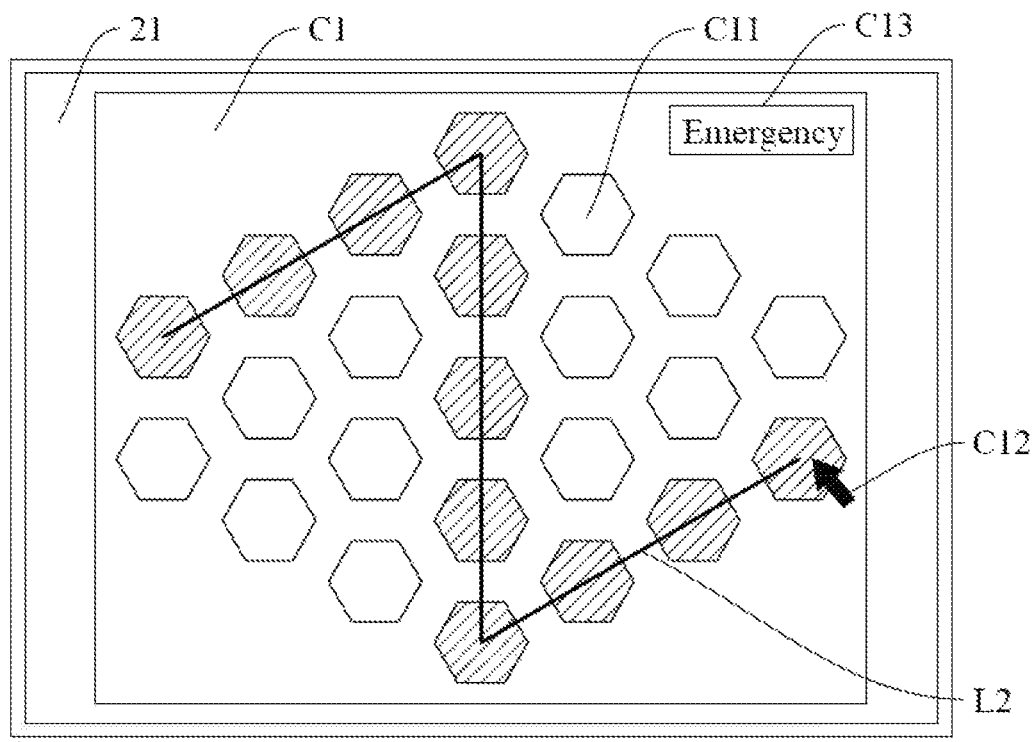

In another preferred embodiment, the graphical interface contains graphics to be watched at and selected by the user such that the user can request rescue secretly while performing non-volitional menu operation. Referring to FIG. 9-1 through FIG. 9-2, an emergency button C13 is shown at the upper right corner of an eye movement traces input interface C1 of the graphic producing module 33. If the user is operating the device under duress, the user's eye movement can be directed to the emergency button C13 by following the watching direction. After confirming that the user's eye movement has been directed to the emergency button C13, the volitional confirmation module 35 sends an alert signal to a background center or cloud-based rescue center through the network connection apparatus IN.

In another preferred embodiment, the volitional confirmation module 35 provides, for example, a hidden interface which can be executed behind the scene and triggered by the user's eye movements. When under duress, the user can enter related eye movements (for example, regular or irregular eye rotational movements according to the watching direction) into the menu. When the volitional confirmation module 35 detects, through the eye-movement analyzing module 32, that the user is performing predefined eye movements, the volitional confirmation module 35 generates a related control signal. In a preferred embodiment, the user uses eye movements to decide a rescue command to be sent or decide who to request rescue. For instance, the user calls the police or contacts a cloud-based accident-reporting system or a background service system, by a specific eye movement. In case of a fire, the user will call a fire department or contact a background system, by another specific eye movement, to request accident-reporting support. Alternatively, the user sends the request to a background center or a cloud-based rescue system to give an alert.

Figure 5:
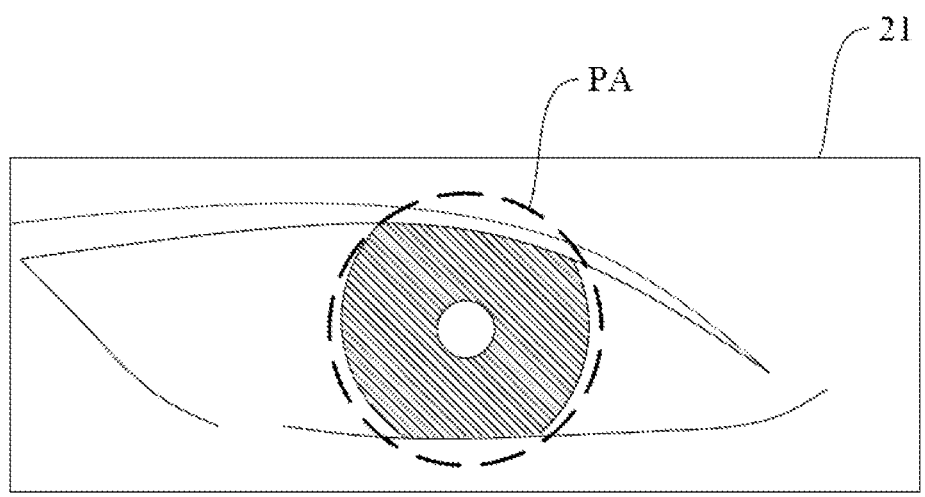
FIG. 5 is a schematic view (1) of a facial feature comparison menu of the present invention.
Figure 6:
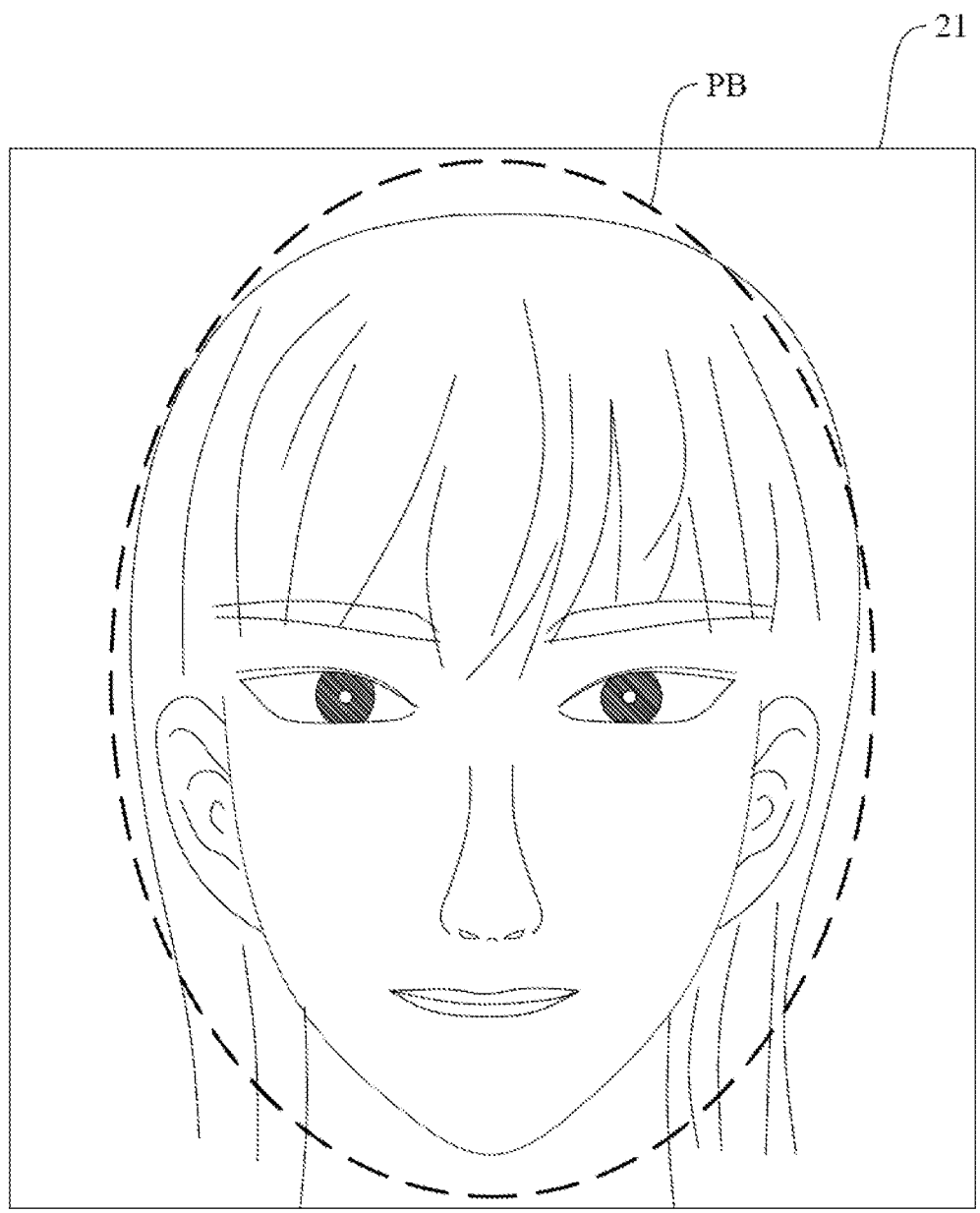
FIG. 6 is a schematic view (2) of the facial feature comparison menu of the present invention.
Figure 7:
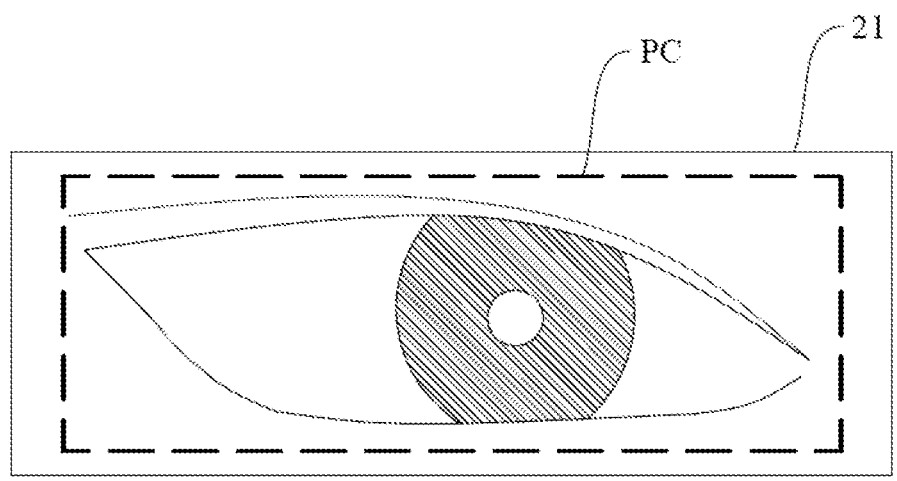
FIG. 7 is a schematic view (3) of the facial feature comparison menu of the present invention.

A specific embodiment is described below with reference to FIG. 5, FIG. 6, and FIG. 7. A facial feature comparison menu according to a preferred embodiment of the present invention is hereunder described with reference to FIG. 5.

When the user starts the eye movement traces authentication system 100, the graphic producing module 33 displays facial feature verification menus (iris verification menu, face verification menu, and sclera verification menu) on the display interface 21. This embodiment is about capturing the user's iris features for comparison. The iris verification menu displays an iris aligning graphic PA. To undergo identity verification, the user puts his or her eye near the image capturing device 10 to allow the image capturing device 10 to capture the user's eye image. Then, the captured eye image is displayed on the iris verification menu. While the eye image capturing process is underway, the eye movement traces authentication system 100 starts a near infrared-emitting device (not shown) for illuminating the user's eye. The user moves in front of the image capturing device 10 according to the position of the iris aligning graphic PA relative to the user's eye image to align the iris region in the user's eye image with the center of the iris aligning graphic PA and thus assist the facial feature recognition module 31A in capturing the user's iris image and eventually compare it with iris data (facial data) of the database 36 to finalize identity verification.

An embodiment of face feature comparison is described below with reference to FIG. 6.

In this embodiment, the user's face features are captured for comparison. To perform facial feature recognition, the graphic producing module 33 displays a face aligning graphic PB on the face verification menu. The face aligning graphic PB is elliptic and is displayed centrally in the facial feature comparison menu. The image capturing device 10 captures the user's face image. The captured face image is displayed on the face verification menu. The user moves in front of the image capturing device 10 according to the position of the face aligning graphic PB relative to the user face image to confirm that the range of the profile of the user can be fully moved to the inward of the face aligning graphic PB and thus assist the facial feature recognition module 31A in effectuating recognition according to the user's face feature image, and compare it with the face data of the database 36, thereby finalizing identity verification.

An embodiment of sclera feature comparison is described below with reference to FIG. 7.

In this embodiment, the user's sclera features are captured for comparison. The sclera verification menu displays a sclera aligning graphic PC. The sclera aligning graphic PC is rectangular and is disposed centrally in the sclera verification menu. To perform identity verification, the user puts his or her eye near the image capturing device 10 to allow the image capturing device 10 to capture the user's eye image. The captured eye image is displayed in the sclera verification menu. The user moves in front of the image capturing device 10 according to the position of the sclera aligning graphic PC relative to the user eye image to move the whole eye region in the user eye image to the middle of the sclera aligning graphic PC and thus assist the facial feature recognition module 31A in capturing the user's sclera image, and compare it with sclera data (facial data) of the database 36, thereby finalizing identity verification.

In another preferred embodiment, the facial feature recognition module 31A directly captures the eye region from the facial image to obtain a sclera image and then compares the sclera image to finalize identity verification.

In addition to verifying the user's identity with the facial feature recognition module 31A, the present invention is characterized in that the hand feature recognition module 31B verifies the user hand features and thereby confiinis the user's identity. One of the face verification and the hand verification is executed; alternatively, both of them are carried out to the same product to effectuate face and hand dual verification, but the present invention is not limited thereto.

Figures 1, 8:
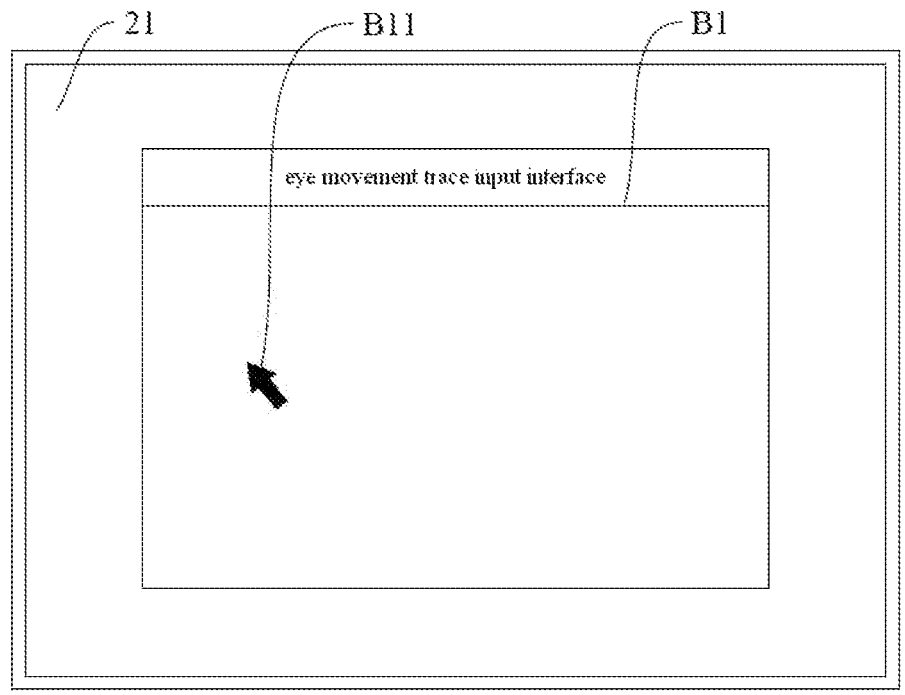
Figures 2, 8:
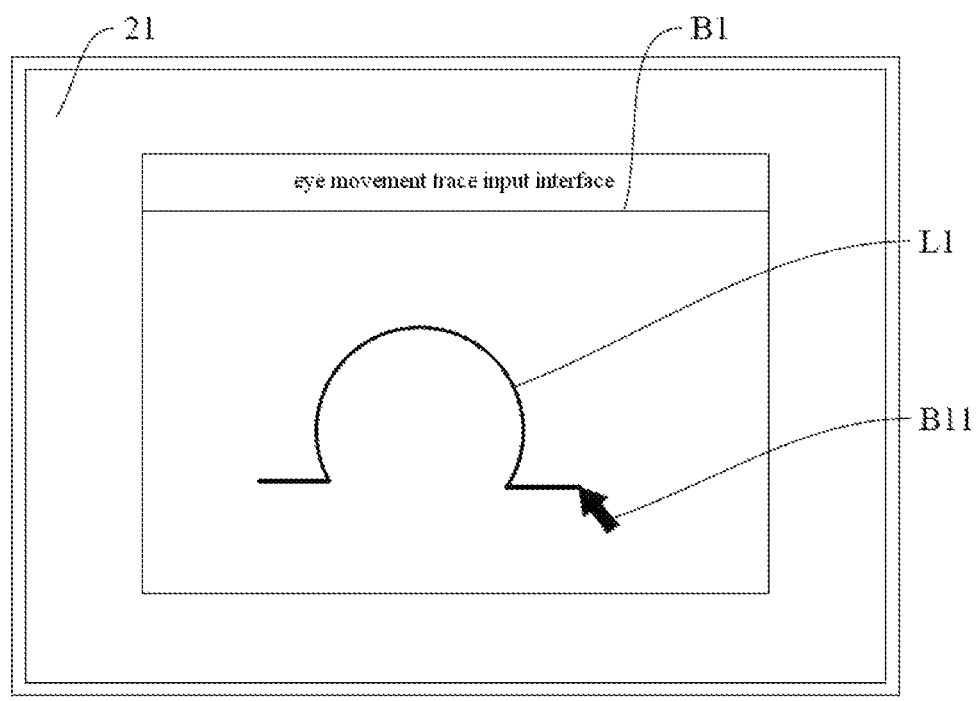

An embodiment of the eye movement traces input interface is described below with reference to FIG. 8-1 through FIG. 8-2.

Upon completion of the user's identity verification, the eye movement traces unlocking module 34 provides eye movement traces input interface B1 on the display device 20 for the user to watch to input eye movement traces-related data according to the direction of the user's eye movement.

In this embodiment, the eye movement traces input interface B1 is a blank window. The blank window displays a cursor B11 whereby the user confirms a watching direction. The cursor B11 moves by following the user's watching direction and determines the starting point and ending point of the traces input according to a control command. After the user has entered a control command, the current position of the cursor B11 is the starting point for the traces input. After the user has entered a control command again, the current position of the cursor B11 is the ending point for the traces, thereby ending the traces plotting process (as shown in FIG. 8-2), so as to draw an eye movement traces line L1. The eye movement traces line L1 thus obtained is encoded into traces codes. Then, the traces codes are stored as traces input information. The traces input information is compared with traces data pre-stored in the user index and corresponding to the user, so as to verify the user identity.

In a preferred embodiment, the user presses a physical or virtual button to input the control command to determine the starting point and ending point of a traces. In another preferred embodiment, the control command determines the starting point and ending point of a traces through the user's eye movement command (such as a wink).

Another preferred embodiment of the eye movement traces input interface is described below with reference to FIG. 9-1 through FIG. 9-2.

In this embodiment, the eye movement traces input interface C1 displays a plurality of guide graphics C11. The guide graphics C11 are distributed across the eye movement traces input interface C1. The user targets at and looks at the guide graphics C11 while watching the eye movement traces input interface C1; hence, the guide graphics C11 guide the user's eye movement and increase the accuracy of inputting an eye movement traces line L2. After the user's eye movement (cursor C12) has been moved to the guide graphics C11, the guide graphics C11 change their graphic features (for example, become highlighted in black) to allow the user to confirm the position of watching direction movement, thereby allowing the user to confirm a traces thus input. Upon completion of the inputting of the traces, the eye movement traces line L2 is obtained and encoded into traces codes. Then, the traces codes are stored as traces input information. The traces input information is compared with traces data pre-stored and corresponding to the user, so as to verify the user identity.

Figures 1, 10:
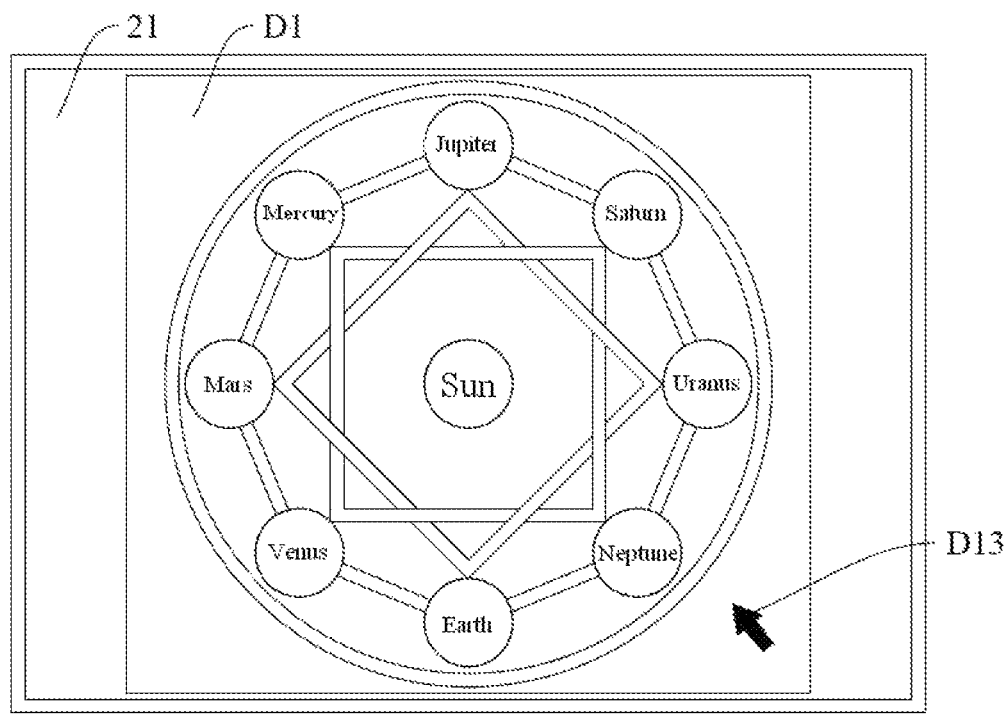
Figures 2, 10:
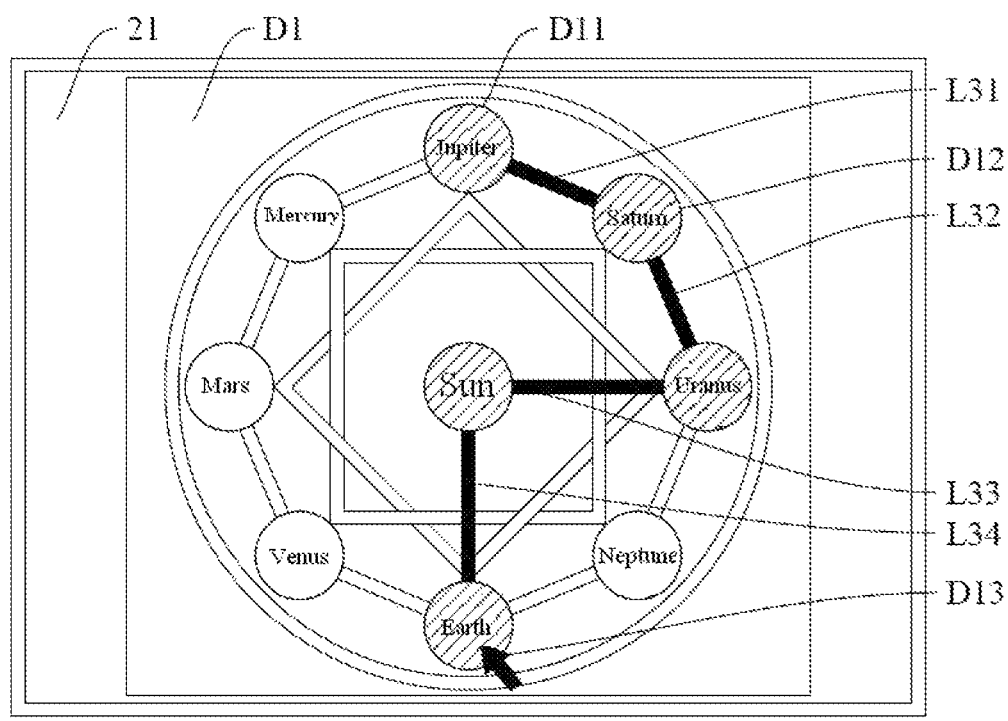

Another preferred embodiment of the eye movement traces input interface is described below with reference to FIG. 10-1 through FIG. 10-2.

In this embodiment, the eye movement traces input interface D1 displays a plurality of selectable objects for the user to move a cursor D13 for selecting one of the selectable objects. When the user watching direction stays with object D11, a timer of the system is started to calculate the duration of the stay of the user eye movement. If the duration of the stay exceeds a threshold, it will be confirmed that the user has selected the object D11, and thus the user's watching direction will move to the next object, i.e., object D12. After the user's watching direction has moved to the next object, i.e., object D12 and selected it, object D12 and the previous object, i.e., object D11 are spontaneously connected by a line L31. Referring to FIG. 10-2, the user's watching direction stays with Jupiter (starting point)-Saturn-Uranus-Sun-Earth (ending point) in sequence. The line L31 is entered when the user's eye movement switches from Jupiter to Saturn and finalizes a selection. The line L32 is entered when the user's eye movement switches from Saturn to Uranus and finalizes a selection. The line L33 is entered when the user's eye movement switches from Uranus to Sun and finalizes a selection. The line L34 is entered when the user's eye movement switches from Sun to Earth and finalizes a selection. After all the lines have been entered, the eye movement traces unlocking module 34 encodes the lines L31-L34 into traces codes, stores the traces codes as traces input information, and compares the traces input information with traces data pre-stored and corresponding to the user, so as to verify the user identity.

Figure 11:
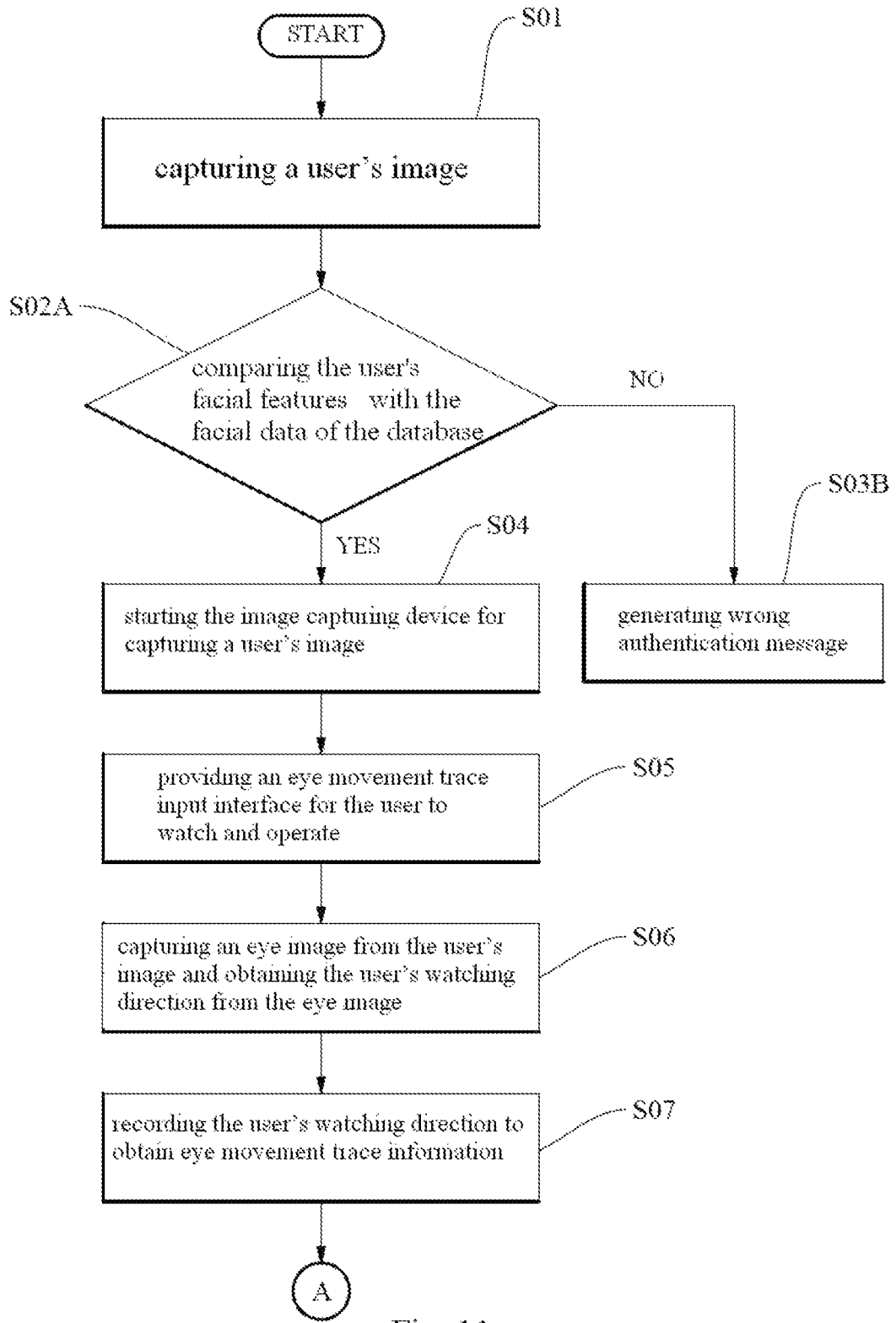
FIG. 11 is a process schematic view (1) of an eye movement traces authentication method which integrates with face recognition according to the present invention.

The eye movement traces authentication method of the present invention is hereunder described with reference to FIG. 11, FIG. 12, and FIG. 13 which are process schematic views (1), (2), (3) of the eye movement traces authentication method of the present invention, respectively.

The eye movement traces authentication method is applicable to the hardware of the eye movement traces authentication system 100. The eye movement traces authentication method comprises the steps described below.

After the eye movement traces authentication system 100 has started, the eye movement traces authentication system 100 starts the image capturing device 10 for capturing a user's image (step S01).

Afterward, the eye movement traces authentication system 100 captures facial features from the user's image and compares the facial features with facial data of the database 36, so as to confirm the user's identity (step S02A). Upon confirmation that the user's identity has authority, a graphic authentication process begins. Conversely, upon confirmation that the user's identity does not have authority, a wrong authentication message is generated (step S03A). The facial features are iris images of the iris region in the user's eye image, or face profile, relative positions of face features, and facial protuberances shown in the user's face image, or images of blood vessel distribution features of the sclera region in the user's eye image. In another preferred embodiment, the user's image authentication is configured to begin only after passwords have been entered, but the present invention is not limited thereto.

Figure 12:
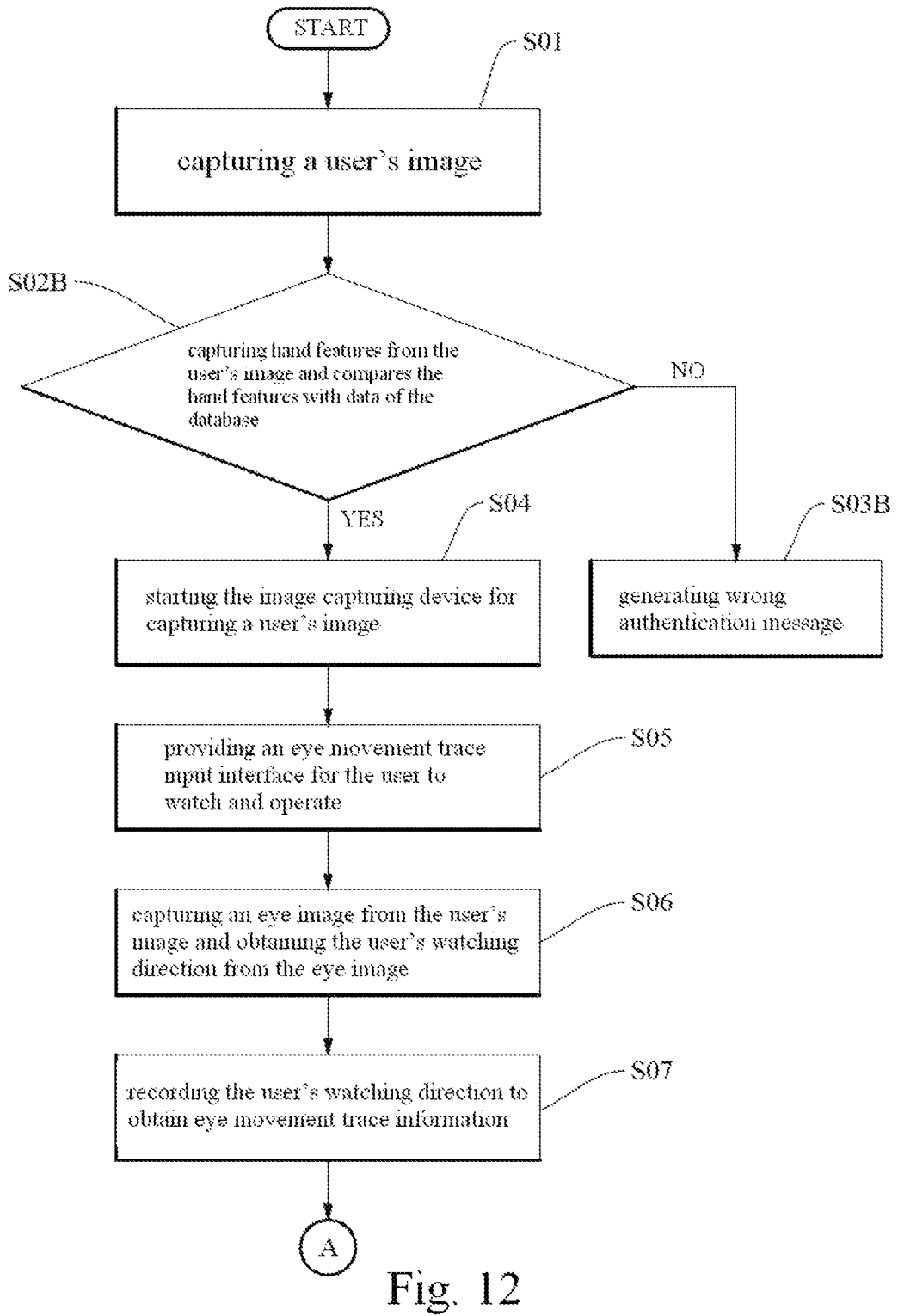
FIG. 12 is a process schematic view (2) of the eye movement traces authentication method which integrates with face recognition according to the present invention.
Figure 13:
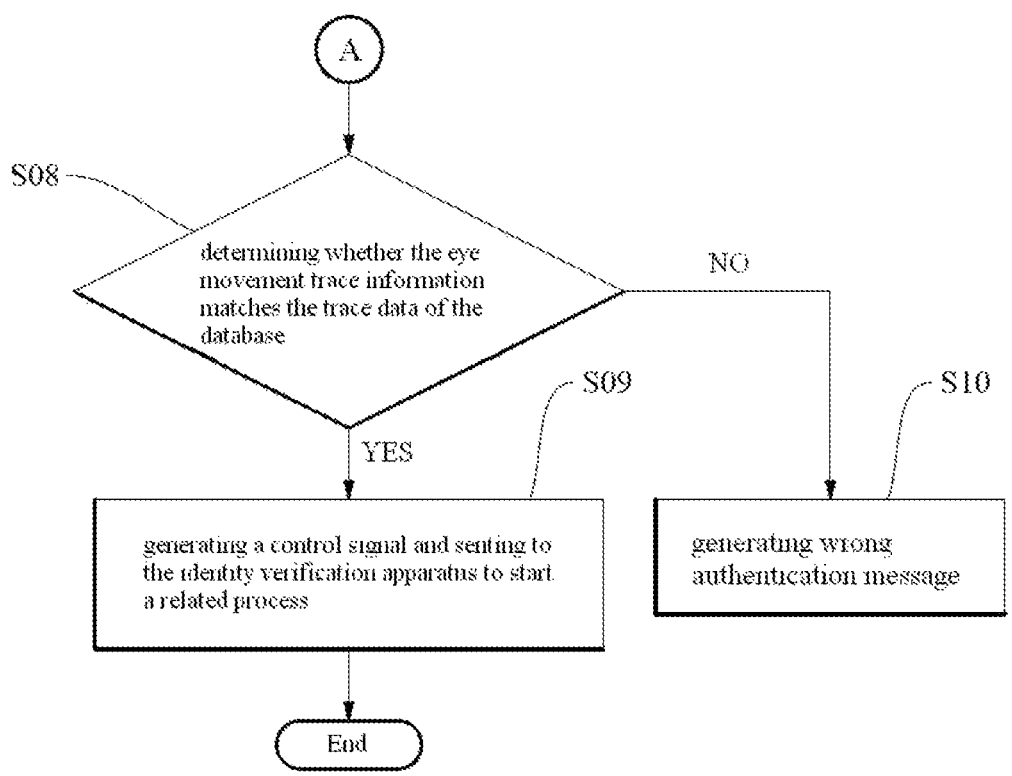
FIG. 13 is a process schematic view (3) of the eye movement traces authentication method which integrates with face recognition according to the present invention.

In addition to the aforesaid embodiments of face recognition, the user's identity is confirmed by hand feature authentication as shown in FIG. 12 and described below. The eye movement traces authentication system 100 captures hand features from the user's image and compares the hand features with data of the database 36, so as to confirm the user's identity (step S02B). Upon confirmation that the user's identity has authority, step S04 is executed. Conversely, upon confirmation that the user's identity does not have authority, a wrong authentication message is generated (step S03B). The hand features are fingerprint features in the user's hand image or palm features in the user's hand image. In another preferred embodiment, the user's image authentication is configured to begin only after passwords have been entered, but the present invention is not limited thereto.

Upon confirmation that the user's identity has authority, the eye movement traces authentication system 100 starts the image capturing device 10 for capturing a user's image (step S04).

When it is confirmed in the preceding step that the user has authority, the graphic producing module 33 provides an eye movement traces input interface for the user to watch to operate (step S05). In a preferred embodiment, the eye movement traces input interface provides an auxiliary graphic for the user to watch, so that the user inputs the eye movement traces information according to the auxiliary graphic.

After the eye movement traces input interface is provided on the display device 20, the eye-movement analyzing module 32 captures an eye image from the user's image and obtains the user's watching direction from the eye image (step S06). At this point in time, the graphic producing module 33 provides a cursor for following the user's watching direction, so as to operate the eye movement traces input interface according to the user's watching direction.

Afterward, the eye movement traces unlocking module 34 records the user's watching direction to obtain eye movement traces information (step S07).

Finally, the eye movement traces unlocking module 34 compares the eye movement traces information with the traces data of the database 36 to determine whether the eye movement traces information matches the traces data of the database 36 (step S08). If the determination is affirmative, a control signal will be generated and sent to the identity verification apparatus 1A to start a related process (step S09). If the determination is negative, a wrong authentication message will be generated (step S10).

Figure 14:
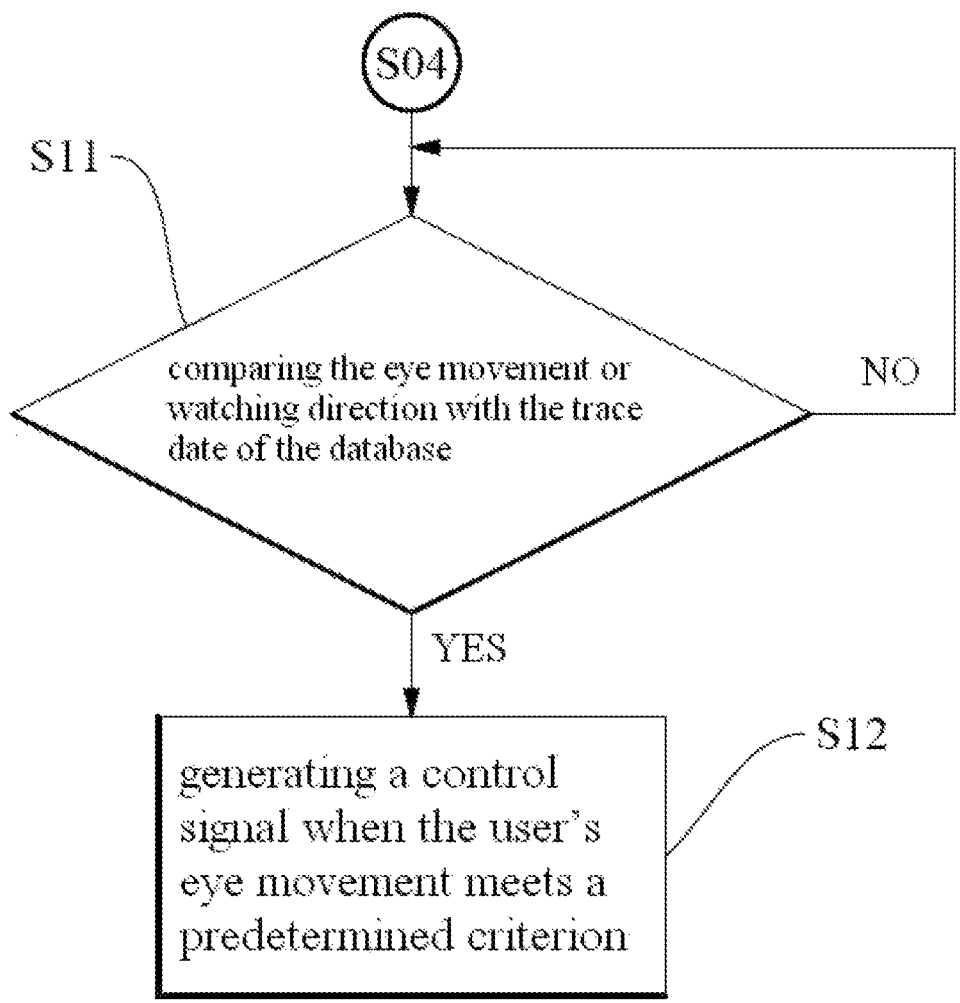
FIG. 14 is a process schematic view (4) of the eye movement traces authentication method which integrates with hand recognition according to the present invention.

During the aforesaid process, before verification, or after verification, the volitional confirmation module 35 provides a graphical interface or a hidden interface for the user to watch to input, so as to confirm whether the user is operating volitionally according to the user's eye movement or watching direction. Referring to FIG. 14, in a preferred embodiment, the hidden interface is executed behind the scene while the volitional confirmation process is underway, so as to compare the eye movement or watching direction with the traces data of the database 36 (step S11), and in consequence a control signal is generated when the user's eye movement meets a predetermined criterion (step S12).

In another preferred embodiment, the volitional confirmation module 35 sends at random an enquiry-response request to the user for responding to questions posted on the graphical interface, determines, in accordance with the user's eye movement in the course of responding to the enquiry-response questions, whether the user is operating the menu volitionally, and generates a control signal when it is determined that the user is operating the menu not volitionally.

The steps of the method are executed by a computer-readable medium. The computer-readable medium is, for example, read-only memory, flash memory, floppy disk, hard disk drive, compact disk, USB flash drive, magnetic tape, network-accessible database, or functionally-equivalent storage medium which persons skilled in the art can easily think of. The method is implemented when executed by an eye movement traces authentication program loaded onto a computer.

In addition to the computer-readable medium, the steps of the method can be implemented when presented in the form of a computer program product, which is stored on the hard disk drive or memory device of a network-based server, such as App Store, Google Play, windows Store, or any other similar platforms for online distribution of applications, to upload the computer program product to the server such that the user can pay for and download it.

To sum up, the present invention uses verifying a user's identity by face recognition (or hand recognition) and eye movement traces to reduce the likelihood that passwords will be cracked by a third party. The aforesaid technology not only ensures that passwords for use in Web-based activities and real-world activities will not be lost or reproduced, but also ensures that users will use the passwords volitionally. The present invention uses the eye movement traces authentication so that the same password string is never reused and thus cannot be cracked by a third party, not to mention that the eye movement traces authentication reduces the chance that a third party will guess the password string right.

The above is the detailed description of the present invention. However, the above is merely the preferred embodiment of the present invention and cannot be the limitation to the implement scope of the present invention, which means the variation and modification according the present invention may still fall into the scope of the invention.

What is claimed is:

1. An eye movement traces authentication system, comprising:
    an image capturing device for capturing a user's image;

a display device for providing a display interface for the user to watch; and a controller that obtains the user's image from the image capturing device, and obtains the user's watching direction whereby tracking an eye image of the user's image, wherein the controller provides a graphical interface to the display device for user to input an eye movement traces information whereby the controller marks and connects the projection of eye movement based on the user's watching direction to produce a display of a trace graphic in the graphical interface as the eye movement traces information, and compares the similarity between the trace graphic and a pre-stored graphic of traces data pre-stored in a database by the user, generates a control signal to an identity verification apparatus when the trace graphic matches the pre-stored graphic of the traces data, the control signal indicating successful authentication, wherein the controller also provides a graphical interface or a hidden interface to the display device for the user to obtain the user's eye movement or watching direction, and presets a triggering condition of the user's eye movement or watching direction to trigger a distress signal to a third party device to ensure whether the user is operating volitionally.

2. The eye movement traces authentication system of claim 1, wherein the controller provides an eye movement traces input interface to the display device for the user, so that the user inputs the eye movement traces information according to the user's watching direction.

3. The eye movement traces authentication system of claim 2, wherein the eye movement traces input interface provides an auxiliary graphic for the user to watch, so that the user inputs the eye movement traces information according to the auxiliary graphic.

4. An eye movement traces authentication system which integrates with face recognition, comprising:

an image capturing device for capturing a user's image;

a display device for providing a display interface for the user to watch; and a controller that obtains the user's image from the image capturing device, and captures facial features from the user's image to compare with facial data of a database so as to verify the user's identity, wherein the controller also obtains the user's watching direction according to an eye image of the user's image, and provides a graphical interface to the display device for user to input an eye movement traces information whereby the controller marks and connects the projection of eye movement based on the user's watching direction to produce a display of a trace graphic in the graphical interface as the eye movement traces information, and compares the similarity between the trace graphic and a pre-stored graphic of traces data pre-stored in a database by the user, generates a control signal to an identity verification apparatus when the trace graphic matches the pre-stored graphic of the traces data, the control signal indicating successful authentication.

5. The eye movement traces authentication system of claim 4, wherein the facial features include one of face feature images, iris images, and images of blood vessel distribution of a sclera region.

6. An eye movement traces authentication system which integrates with hand recognition, comprising:

an image capturing device for capturing a user's image;

a hand feature capturing device for capturing the user's hand feature information;

a display device for providing a display interface for the user to watch; and a controller that obtains the user's hand feature information from the hand feature capturing device, and compares the hand feature information with data of a database, so as to verify the user's identity, wherein the controller also obtains the user's watching direction according to an eye image of the user's image, and provides a graphical interface to the display device for user to input an eye movement traces information whereby the controller marks and connects the projection of eye movement based on the user's watching direction to produce a display of a trace graphic in the graphical interface as the eye movement traces information, and compares the similarity between the trace graphic and a pre-stored graphic of traces data pre-stored in a database by the user, generates a control signal to an identity verification apparatus when the trace graphic matches the pre-stored graphic of the traces data, the control signal indicating successful authentication.

7. The eye movement traces authentication system of claim 6, wherein the hand feature information includes one of fingerprint feature information and palm feature information.

8. The eye movement traces authentication system of claim 4, wherein the controller also provides a graphical interface or a hidden interface to the display device for the user to obtain the user's eye movement or watching direction, and preset a triggering condition of the user's eye movement or watching direction to trigger a distress signal to a third party device to ensure whether the user is operating volitionally.

9. The eye movement traces authentication system of claim 4, wherein the controller provides an eye movement traces input interface to the display device for the user, so as to input the eye movement traces information according to the user's watching direction.

10. The eye movement traces authentication system of claim 9, wherein the eye movement traces input interface provides an auxiliary graphic for the user to watch, so that the user inputs the eye movement traces information according to the auxiliary graphic.

11. An eye movement traces authentication method, comprising the steps of:

capturing a user's image via an image capturing device;

obtaining the user's image from an image capturing device via a controller, and obtaining the user's watching direction by tracking an eye image of the user's image;

wherein the controller provides a graphical interface to a display device for user to input an eye movement traces information whereby the controller marks and connects the projection of eye movement based on the user's watching direction to produce a display of a trace graphic in the graphical interface as the eye movement traces information and compares the similarity between the trace graphic and a pre-stored graphic of traces data pre-stored in a database by the user, generating a control signal to an identity verification apparatus when the trace graphic matches the pre-stored graphic of the traces data, the control signal indicating successful authentication; and during the above steps, providing, via the controller, a graphical interface or a hidden interface for the user, obtaining the user's eye movement or watching direction, and presetting a triggering condition of the user's eye movement or watching direction to trigger a distress signal to a third party device to ensure whether the user is operating volitionally.

12. An eye movement traces authentication method which integrates with face recognition, comprising the steps of:
capturing a user's image via an image capturing device;
obtaining, via a controller, the user's image from the image capturing device, and capturing facial features from the user's image to compare with facial data of a database so as to verify the user's identity;
providing, via the controller, a graphical interface to a display device for user to input an eye movement traces information and whereby the controller marks and connects the projection of eye movement based on the user's watching direction to produce a display of a trace graphic in the graphical interface as the eye movement traces information; and
comparing the similarity between the trace graphic and a pre-stored graphic of traces data pre-stored in a database by the user, and generating a control signal to an identity verification apparatus when the trace graphic matches the pre-stored graphic of the traces data, the control signal indicating successful authentication.

13. The eye movement traces authentication method of claim 12, wherein the facial features include one of face feature images, iris images, and images of blood vessel distribution of a sclera region.

14. An eye movement traces authentication method which integrates with hand recognition, comprising the steps of:
capturing, via an image capturing device and a hand feature capturing device, a user's images;
capturing, via a controller, hand feature information from the user's image and comparing the hand feature information with hand data of a database, so as to confirm the user's identity;
providing, via the controller, a graphical interface to a display device for user to input an eye movement traces information whereby the controller marks and connects the projection of eye movement based on the user's watching direction to produce a display of a trace graphic in the graphical interface as the eye movement traces information; and
comparing the similarity between the trace graphic and a pre-stored graphic of traces data pre-stored in a database by the user, and generating a control signal to an identity verification apparatus when the trace graphic matches the pre-stored graphic of the traces data, the control signal indicating successful authentication.

15. The eye movement traces authentication method of claim 14, wherein the hand feature information includes one of fingerprint feature information and palm feature information.

16. The eye movement traces authentication method of claim 12, further comprising:
providing, via the controller, a graphical interface or a hidden interface for the user, obtaining the user's eye movement or watching direction, and presetting a triggering condition of the user's eye movement or watching direction to trigger a distress signal to a third party device to ensure whether the user is operating volitionally.

17. The eye movement traces authentication method of claim 11, further comprising: providing, via the controller, an eye movement traces input interface for the user, so as to input the eye movement traces information according to the user's watching direction.

18. The eye movement traces authentication method of claim 17, further comprising: providing, via the controller, an auxiliary graphic for the user to watch, so that the user inputs the eye movement traces information according to the auxiliary graphic.

19. A non-transitory computer readable medium, including computer executable instructions, wherein the instructions, when executed by a controller, cause the controller to perform the following method steps:
obtaining, via a controller, the user's image from an image capturing device, and obtaining the user's watching direction thereby tracking an eye image of the user's image;
providing, via the controller, a graphical interface to a display device for user to input an eye movement traces information whereby the controller marks and connects the projection of eye movement based on the user's watching direction to produce a display of a trace graphic in the graphical interface as the eye movement traces information, and compares the similarity between the trace graphic and a pre-stored graphic of traces data pre-stored in a database by the user, generates a control signal to an identity verification apparatus when the trace graphic matches the pre-stored graphic of the traces data, the control signal indicating successful authentication; and
during the above steps, providing, via the controller, a graphical interface or a hidden interface for the user, obtaining the user's eye movement or watching direction, and presetting a triggering condition of the user's eye movement or watching direction to trigger a distress signal to a third party device to ensure whether the user is operating volitionally.

* * * * *